United States Patent
Broker

(10) Patent No.: US 9,939,169 B2
(45) Date of Patent: Apr. 10, 2018

(54) DRIVING CONTROLS AND DIAGNOSTIC METHODS FOR COMMUNICATING MOTORS

(71) Applicant: Emerson Electric Co., St. Louis, MO (US)

(72) Inventor: John F. Broker, Warrenton, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 0 days.

(21) Appl. No.: 15/335,768

(22) Filed: Oct. 27, 2016

(65) Prior Publication Data

US 2017/0045256 A1   Feb. 16, 2017

Related U.S. Application Data

(63) Continuation of application No. 14/075,372, filed on Nov. 8, 2013, now Pat. No. 9,494,333.

(51) Int. Cl.
 *F24F 11/00* (2018.01)
 *G05B 23/02* (2006.01)

(52) U.S. Cl.
 CPC ............ *F24F 11/77* (2018.01); *F24F 11/006* (2013.01); *F24F 11/0009* (2013.01);
 (Continued)

(58) Field of Classification Search
 CPC .. F24F 11/0079; F24F 11/006; F24F 11/0009; F24F 2011/0061;
 (Continued)

(56) References Cited

U.S. PATENT DOCUMENTS 5,206,568 A * 4/1993 Bjornson ............. G01N 21/253
 318/568.1
5,369,566 A * 11/1994 Pfost .................... G01N 21/253
 700/18
(Continued)

FOREIGN PATENT DOCUMENTS

CN   101340166   1/2009
JP   2006149044   6/2006
(Continued)

OTHER PUBLICATIONS

Canadian Office Action dated Jun. 21, 2016, issued in co-pending Canadian Application No. 2,869,501 which has the same priority claim as the instant application, 5 pgs.

*Primary Examiner* — Ramesh Patel
(74) *Attorney, Agent, or Firm* — Harness, Dickey & Pierce, P.L.C.

(57) ABSTRACT

In exemplary embodiments, methods for operating driving controls for communicating motors are disclosed. In an exemplary embodiment, a method generally includes controlling a transmit circuit of the driving control to generate an expected transmit signal for sending to the communicating motor, and detecting, using a transmit sense circuit in the driving control, the actual resulting signal generated by the transmit circuit signal before the actual resulting signal leaves the driving control and is transmitted to the communicating motor. The method also includes analyzing the detected signal to verify whether the transmit circuit in the driving control is working properly, by comparing the expected transmit signal to the detected actual resulting signal. Exemplary methods are also disclosed of analyzing receive circuits of driving controls to verify whether the receive circuits are working properly.

20 Claims, 4 Drawing Sheets

(52) U.S. Cl.
CPC .......... *F24F 11/0079* (2013.01); *F24F 11/30* (2018.01); *F24F 11/62* (2018.01); *G05B 23/0208* (2013.01); *F24F 11/32* (2018.01); *F24F 11/63* (2018.01); *F24F 2011/0052* (2013.01); *F24F 2011/0061* (2013.01); *G05B 2219/2614* (2013.01); *Y02B 30/746* (2013.01)

(58) Field of Classification Search
CPC ......... F24F 2011/0052; G05B 23/0208; G05B 2219/2614; Y02B 30/746
See application file for complete search history.

(56) References Cited

U.S. PATENT DOCUMENTS

| | | | |
|---|---|---|---|
| 5,473,229 A | 12/1995 | Archer et al. | |
| 5,521,482 A | 5/1996 | Lang et al. | |
| 6,199,018 B1 * | 3/2001 | Quist .................. | G01M 13/028 318/806 |
| 6,262,550 B1 * | 7/2001 | Kliman .............. | G05B 23/0264 318/565 |
| 6,529,135 B1 | 3/2003 | Bowers et al. | |
| 6,646,397 B1 | 11/2003 | Discenzo | |
| 6,658,372 B2 * | 12/2003 | Abraham ................ | F23N 1/002 702/183 |
| 6,826,369 B1 * | 11/2004 | Bondarev ............... | G08C 17/02 398/106 |
| 6,941,785 B2 * | 9/2005 | Haynes .................. | F04B 17/03 318/799 |
| 7,106,019 B2 | 9/2006 | Becerra et al. | |
| 7,301,296 B1 * | 11/2007 | Discenzo ........... | G05B 19/4063 318/400.01 |
| 7,538,512 B2 | 5/2009 | Discenzo | |
| 7,539,549 B1 * | 5/2009 | Discenzo ........... | F04D 15/0077 324/765.01 |
| 7,671,555 B2 * | 3/2010 | Mullin .................. | F04D 27/004 236/51 |
| 7,797,062 B2 * | 9/2010 | Discenzo ............. | G05B 13/024 700/19 |
| 7,949,483 B2 | 5/2011 | Discenzo et al. | |
| 8,067,912 B2 | 11/2011 | Mullin | |
| 8,322,151 B1 * | 12/2012 | Garofalo ................ | G01K 13/00 62/127 |
| 8,417,482 B2 * | 4/2013 | Bohan .................. | G01K 15/007 702/130 |
| 2004/0249485 A1 * | 12/2004 | Bondarev .............. | G08C 17/02 700/71 |
| 2006/0130496 A1 * | 6/2006 | Chapman ............. | F24F 11/0086 62/126 |
| 2006/0275719 A1 | 12/2006 | Hill et al. | |
| 2009/0055019 A1 * | 2/2009 | Stiehl .................... | B25J 9/1671 700/249 |
| 2009/0065596 A1 * | 3/2009 | Seem .................. | F24F 11/0009 236/51 |
| 2012/0010845 A1 * | 1/2012 | Bohan .................. | G01K 15/007 702/130 |
| 2014/0172400 A1 * | 6/2014 | Majewski ........... | G06F 17/5009 703/18 |
| 2015/0081103 A1 * | 3/2015 | Song ..................... | F24F 11/006 700/275 |

FOREIGN PATENT DOCUMENTS

| | | |
|---|---|---|
| KR | 1020070018009 | 2/2007 |
| WO | WO2005/073819 | 8/2005 |

\* cited by examiner

US 9,939,169 B2

DRIVING CONTROLS AND DIAGNOSTIC METHODS FOR COMMUNICATING MOTORS

CROSS-REFERENCE TO RELATED APPLICATION

This application is a continuation of U.S. patent application Ser. No. 14/075,372 filed on Nov. 8, 2013. The entire disclosure of the above application is incorporated herein by reference.

FIELD

The present disclosure relates to driving controls and diagnostic methods for communicating motors.

BACKGROUND

This section provides background information related to the present disclosure which is not necessarily prior art.

Heating, ventilating and air-conditioning (HVAC) systems can be used to regulate the environment within an enclosed space. Typically, an air blower is used to pull air from the enclosed space into the HVAC system and then push the air back into the enclosed space after conditioning the air (e.g., heating, cooling, or dehumidifying the air). Various types of HVAC systems may be used to provide conditioned air for enclosed spaces. In the HVAC industry today, it is common to use communicating motors, which may be capable of sending and/or receiving communications to and/or from a driving control of the communicating motor.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventor has observed that when a problem occurs in an HVAC system with a communicating motor such that the motor doesn't work properly, a driving control often gives an error indicator that indicates there is a problem with communications to the motor. The error indicator doesn't indicate whether the problem occurred in the driving control, the wiring, or the motor. The inventor has also observed that in service of the unit after a problem, a service repair technician or user will usually replace both the motor and the driving control. It would be helpful if the driving control had a self-test diagnostic method to confirm operation of the driving control to further diagnose the problem.

Figure 1:
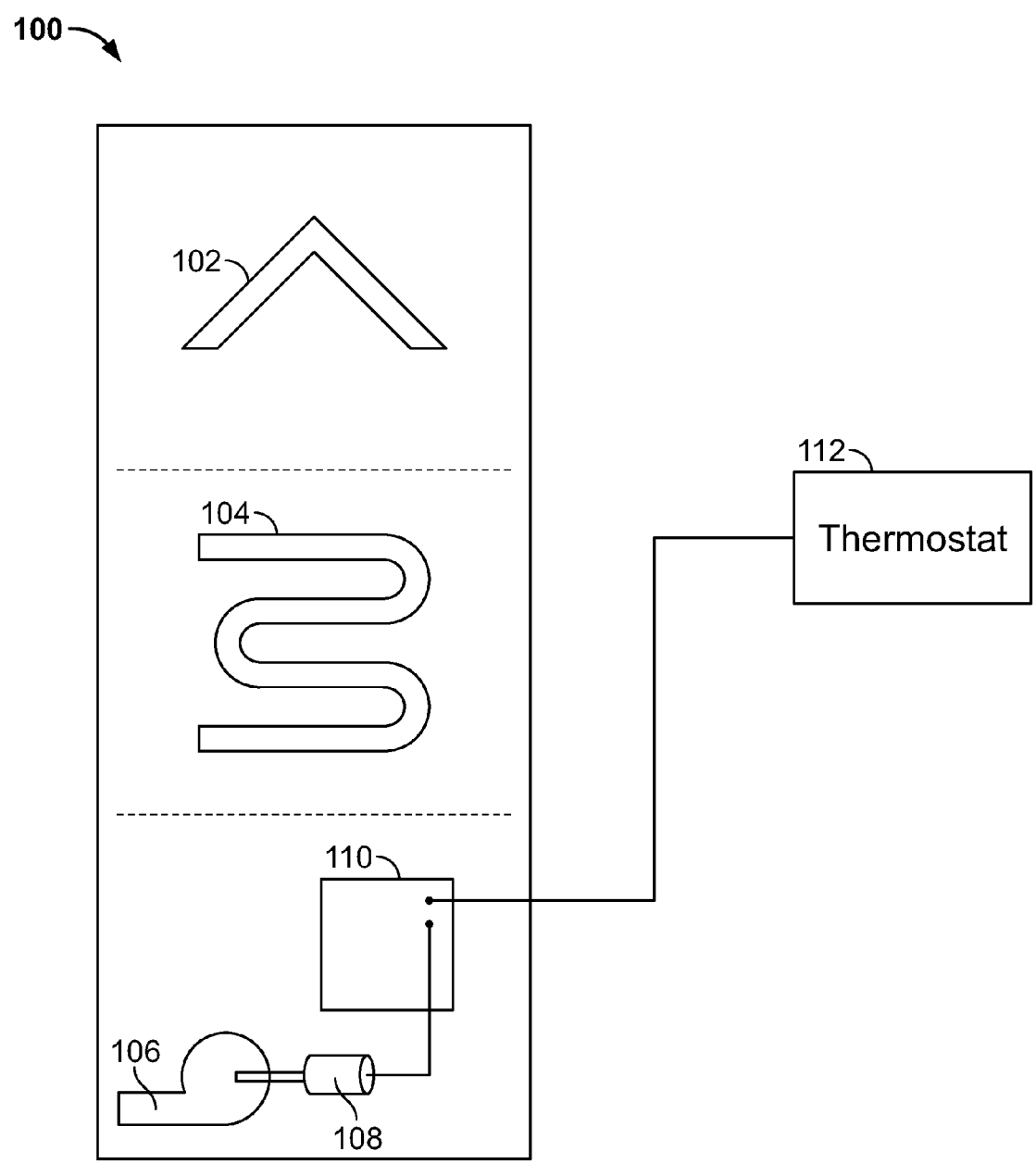
FIG. 1 is a diagram of an example HVAC system configured in accordance with an exemplary implementation of the present disclosure.

With reference to the figures, FIG. 1 illustrates an example HVAC system 100 having an evaporator coil 102 for providing air-conditioning, a heat exchanger 104 for providing heating, and a blower 106 for moving air through the HVAC system. The blower 106 is driven by a motor 108. A driving control 110, which is or includes, for example, an indoor control board, an integrated furnace control, a unitary control, an air handler control, etc., controls the HVAC system 100. A thermostat 112 may provide a demand signal to the driving control 110 to operate the blower motor 108 at specified parameters to adjust operation of the HVAC system 100 (e.g., low heat, high heat, low cool, high cool, fan only, etc.).

The HVAC system 100 may be operated for heating, cooling, running the fan only, multistage heating or cooling, or other fan setting adjustments. The blower motor 108 may operate at different speeds or torques to circulate different amounts of air through the system depending on the mode of operation of the HVAC system 100. For example, the blower motor 108 may operate at a lower speed to circulate less air when the HVAC system 100 is in a cooling setting, and the blower motor 108 may operate at a higher speed to circulate more air when the HVAC system 100 is in a heating setting. If there is a two stage heating system, there may be two different blower speeds for different heating modes (e.g., low heat and high heat). There could also be a two stage cooling mode requiring two different motor speeds. Further, the blower 106 may be operated to run the fan only without heating or cooling.

Different air circulation needs for different HVAC system 100 settings require the blower motor 108 to be capable of operating at different speeds given the particular HVAC setting. The driving control 110 can control the speed of the motor 108 by providing the appropriate signal to the motor 108 based on the HVAC system setting. The driving control 110 may determine the HVAC system setting based on a demand signal from a thermostat 112, user setting, or other HVAC system controller. Typical demand signals may include a W1 signal for low heat, a W2 signal for high heat, and a Y1 signal for low cool.

Blower motors are typically electrically commutated motors (ECMs). The blower motor 108 may be a communicating motor. Motor 108 can be capable of receiving communication signals from the driving control 110, as well as sending signals back to the driving control 110.

Figure 2:
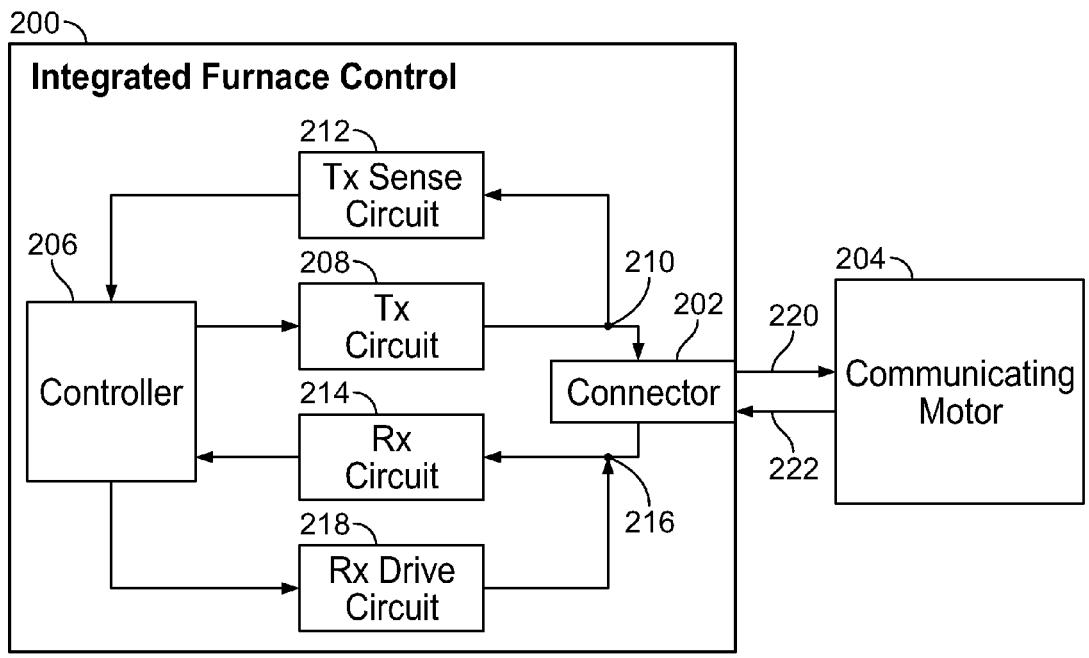
FIG. 2 is a diagram of a driving control for a communicating motor configured in accordance with an exemplary implementation of the present disclosure.

In one exemplary embodiment of the disclosure, and as shown in FIG. 2, a driving control 200 includes a connector 202 for coupling to a communicating motor 204. The driving control 200 includes a controller 206 and a transmit (Tx) circuit 208 coupled between the controller 206 and the connector 202. A first node 210 is coupled between the transmit circuit 208 and the connector 202. The driving control 200 also includes a transmit sense circuit 212 coupled between the first node 210 and controller 206. Additionally, the driving control 200 includes a receive (Rx) circuit 214 coupled between the connector 202 and the controller 206, a second node 216 coupled between the connector 202 and the receive circuit 214, and a receive drive circuit 218 coupled between the second node 216 and the controller 206.

In this example embodiment, the driving control 200 is illustrated as an integrated furnace control. It is understood that in other embodiments, the driving control 200 may be any system capable of controlling a communicating motor, such as, for example, a unitary control, an air handler, or any control that either communicates with a motor or has the motor control built into it.

In this example embodiment, the connector 202 includes an output and an input for coupling to the communicating motor 204. The communicating motor 204 is connected to an output of the connector 202 of the driving control 200 via a first wire 220 for receiving communications from the driving control 200, and is connected to an input of the connector 202 for sending communications to the driving control 200 via a second wire 222. It is understood that in some other embodiments, the connector 202 may only include an output for sending communications to the communicating motor 204, or may only include an input for receiving communications from the communicating motor 204. The driving control 200 and communicating motor 204 may communicate using any signals capable of being generated or interpreted by the driving control 200 and/or communicating motor 204. Although the driving control 200 and communicating motor 204 are coupled by first and second wires in the example embodiment shown in FIG. 2, it is understood that any other connection structures may be implemented that are capable of transmitting communication signals to and/or from the driving control 200 and/or communicating motor 204.

The controller 206 is configured to control the transmit circuit 208 to cause the transmit circuit 208 to generate signals to be sent to the communicating motor 204. The controller 206 may include any type of device capable of controlling the transmit circuit 208, such as, for example, a microprocessor, microcontroller, a programmable gate array, a logic device, an ASIC, etc. The transmit circuit 208 is configured to provide a signal to the output of the connector 202 for transmitting to the communicating motor 204.

The transmit sense circuit 212 is coupled between the first node 210 and the controller 206. The transmit sense circuit 212 is configured to detect the signal provided to the output of the connector 202 by the transmit circuit 208, and the controller 206 is configured to analyze the detected signal to determine whether the transmit circuit 208 is operational. In this manner, the transmit sense circuit 212 can read the transmit signal before it leaves the driving control 200. The signal being sent to the communicating motor 204 can be checked to verify whether the hardware of the transmit circuit 208 is working properly. For example, the controller 206 can control the transmit circuit 208 to generate a test expected transmit signal. Then, the controller 206 can analyze the resulting signal generated by the transmit circuit 208 by detecting the signal using the transmit sense circuit 212. The controller 206 can compare the test expected transmit signal to the actual resulting signal generated by the transmit circuit 208 to determine whether the transmit circuit 208 is working properly.

The receive circuit 214 is coupled between the second node 216 and the controller 206. The receive circuit 214 is configured to receive signals from the input of the connector 202 and provide a receive signal to the controller 206. In some embodiments, the receive circuit 214 may generate a receive signal representing communication coming from the communicating motor 204, or the receive circuit 214 may directly pass communication signals from the communicating motor 204 to the controller 206.

The receive drive circuit 218 is coupled between the second node 216 and the controller 206. The receive drive circuit 218 is configured to provide a test signal to the receive circuit 214, and the controller 206 is configured to analyze the resulting receive signal generated by the receive circuit 214 in response to the test signal to determine whether the receive circuit 214 is operational. In this manner, the controller 206 can control the receive drive circuit 218 to toggle the receive circuit 214 input. The receive drive circuit 218 can provide a test signal to the receive circuit 214, possibly representing a typical signal that may be received from the communicating motor 204. The controller 206 can then analyze the resulting signal generated by the receive circuit 214 to verify if the receive circuit hardware properly transmitted the test signal.

Although this example embodiment includes both a transmit sense circuit 212 and a receive drive circuit 218, it is understood that other embodiments may include only one or the other. For example, some embodiments may include only a transmit sense circuit 212 and no receive drive circuit 218, such that the driving control 200 is only capable of testing the transmit circuit 208 hardware. Other embodiments may include only a receive drive circuit 218 and no transmit sense circuit 212 such that the driving control 200 is only capable of testing the receive circuit 214 hardware.

Figure 3:
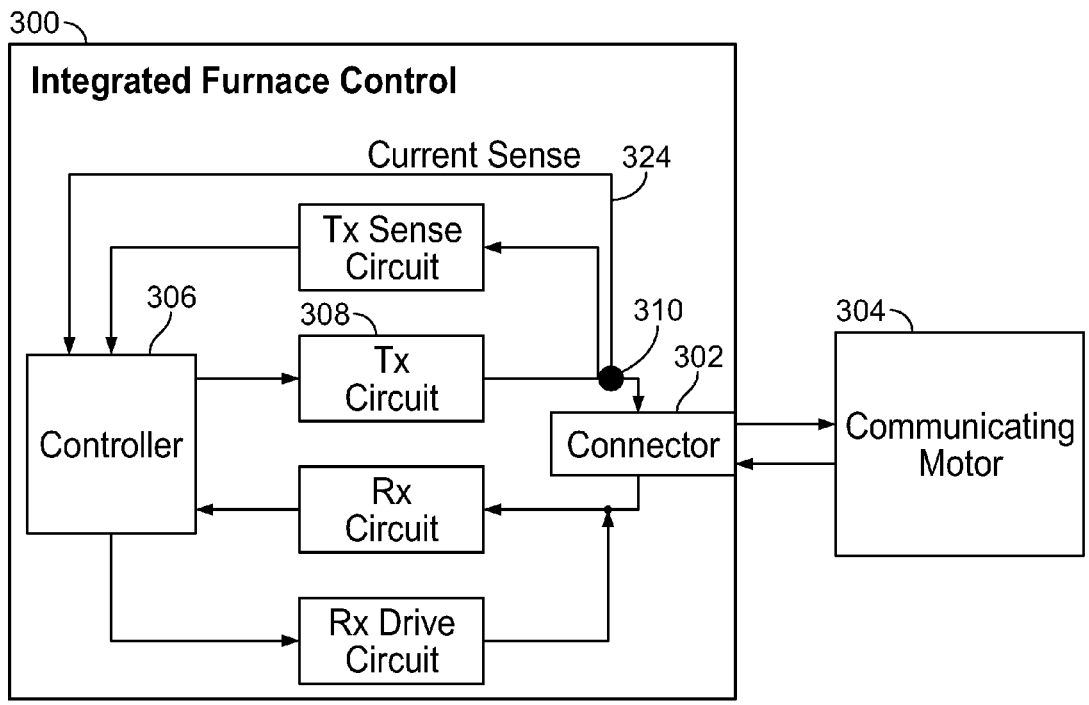
FIG. 3 is a diagram of a driving control for a communicating motor configured in accordance with an exemplary implementation of the present disclosure.

In another exemplary embodiment of the disclosure as shown in FIG. 3, a driving control 300 includes a current sense 324 coupled between a first node 310 and a controller 306. The current sense 324 may be configured to detect current flowing from the transmit circuit 308 to the output of the connector 302. In this manner, the current sense 324 can check the connection from the driving control 300 to the communicating motor 304 to see if it is working properly (e.g., whether the connecting wires are conducting current properly, whether the communicating motor is drawing current for communication signals, etc.). The current sense 324 may be any device capable of detecting the amount of current flowing at the output of the connector 302, such as, for example, a resistor, a Hall effect IC sensor, a transformer, a Rogowski coil, etc.

Although FIG. 3 illustrates only one connected communicating motor 304, other embodiments may have multiple communicating motors connected to the driving control 300. In the event that there are multiple communicating motors 304 connected to the driving control 300, the driving control 300 may have a separate connector 302 coupled to each communicating motor. The driving control 300 may also have a separate current sense 324 coupled between each connector 302 output and the controller 306, in order to sense current to each communicating motor 304 to check the connection to each motor.

In some embodiments, the power supply to the communicating motor 304 may also be sensed. The communicating motor 304 may be capable of sensing the voltage on a power supply pin of the motor 304. In some embodiments, the voltage may be sensed by using a resistor divider network and reading either analog voltage at a microcontroller using an analog input, or using a digital input. The resistor values should be selected such that appropriate voltage levels are available to the pin types used for sensing to work properly over a range of supply voltages. A power supply sense signal may be provided from the communicating motor 304 to the controller 306 of the driving control 300 indicating whether the power supply is working properly.

In some embodiments, the driving control 300 may include an indicator coupled to the controller 306. The indicator may be configured to interface to the user, customer, or servicer to provide more detailed information for better diagnostic information to assist the user in replacing the correct parts of the driving control 300 and/or communicating motor 304. The indicator may be any device capable of providing diagnostic information to a user, such as, for example, a display, user menus, a seven segment display, light emitting diodes (LEDs), counting blinks, liquid crystal displays (LCDs), etc.

In some embodiments, the controller 306 may be configured to receive communicating motor advanced diagnostic information detected by an electronic motor control of the communicating motor 304. The electronic motor control of the communicating motor 304 may be able to detect different types of motor failures, such as, for example, open windings, voltage too high, voltage too low, shorted windings, a locked rotor, etc. The motor control may be able to verify if signals are reaching the pins of the motor control properly, or whether there is a problem. These detected failures may be communicated back to the driving control 300, which may be related to a service person or user to provide advanced diagnostics to further decode problems and aid in troubleshooting. If the main transmit connection from the communicating motor 304 to the driving control 300 has failed, the communicating motor 304 may require an alternate connection to the driving control 300 to communicate advanced diagnostic failures.

Figure 4:
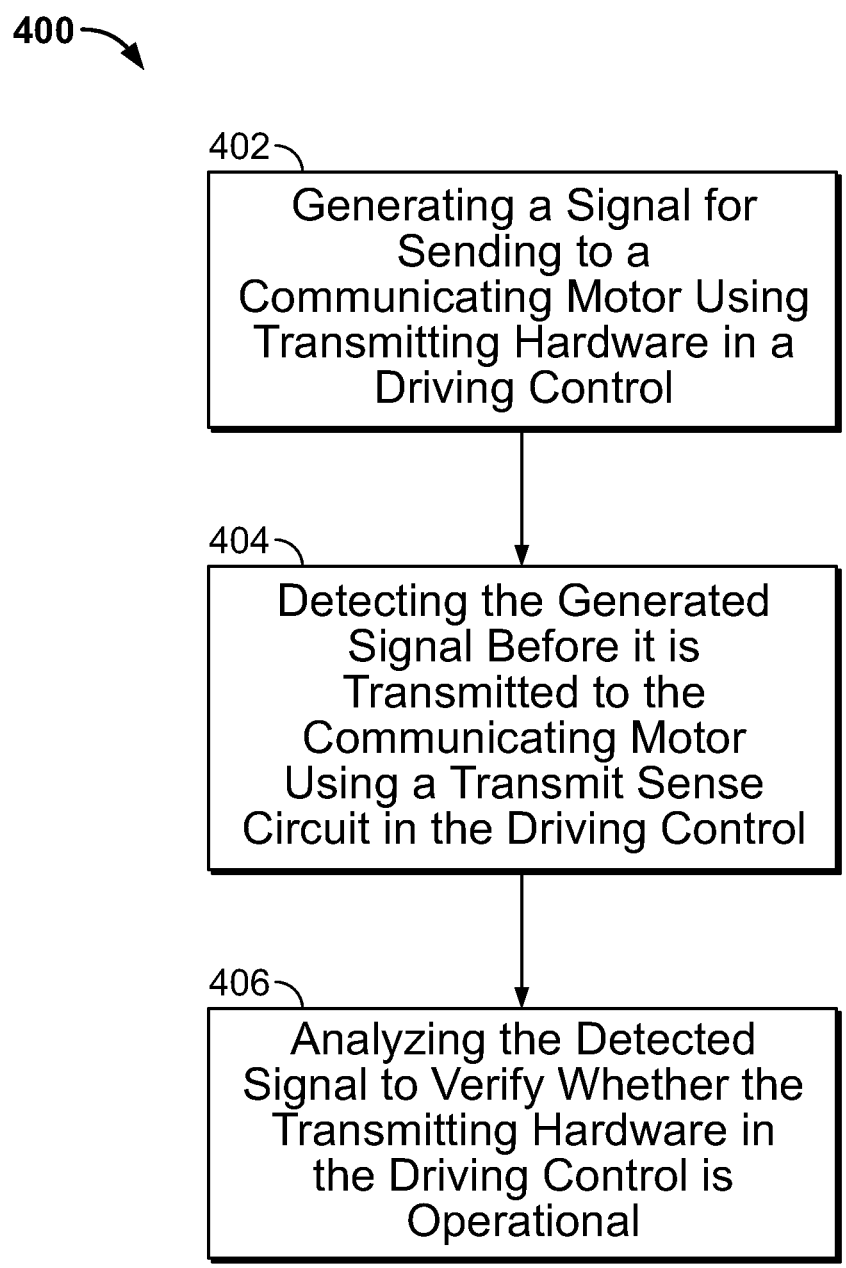
FIG. 4 is a block diagram of a diagnostic method for a communicating motor in accordance with an exemplary implementation of the disclosure.

According to another example embodiment, a diagnostic method for a communicating motor is shown in FIG. 4, referenced generally as method 400. At step, process, or operation 402, the method includes generating a signal for sending to a communicating motor using transmitting hardware in a driving control. At step, process, or operation 404, the method includes detecting the generated signal before it is transmitted to the communicating motor using a transmit sense circuit in the driving control. At step, process, or operation 406, the method includes analyzing the detected signal to verify whether the transmitting hardware in the driving control is operational.

Figure 5:
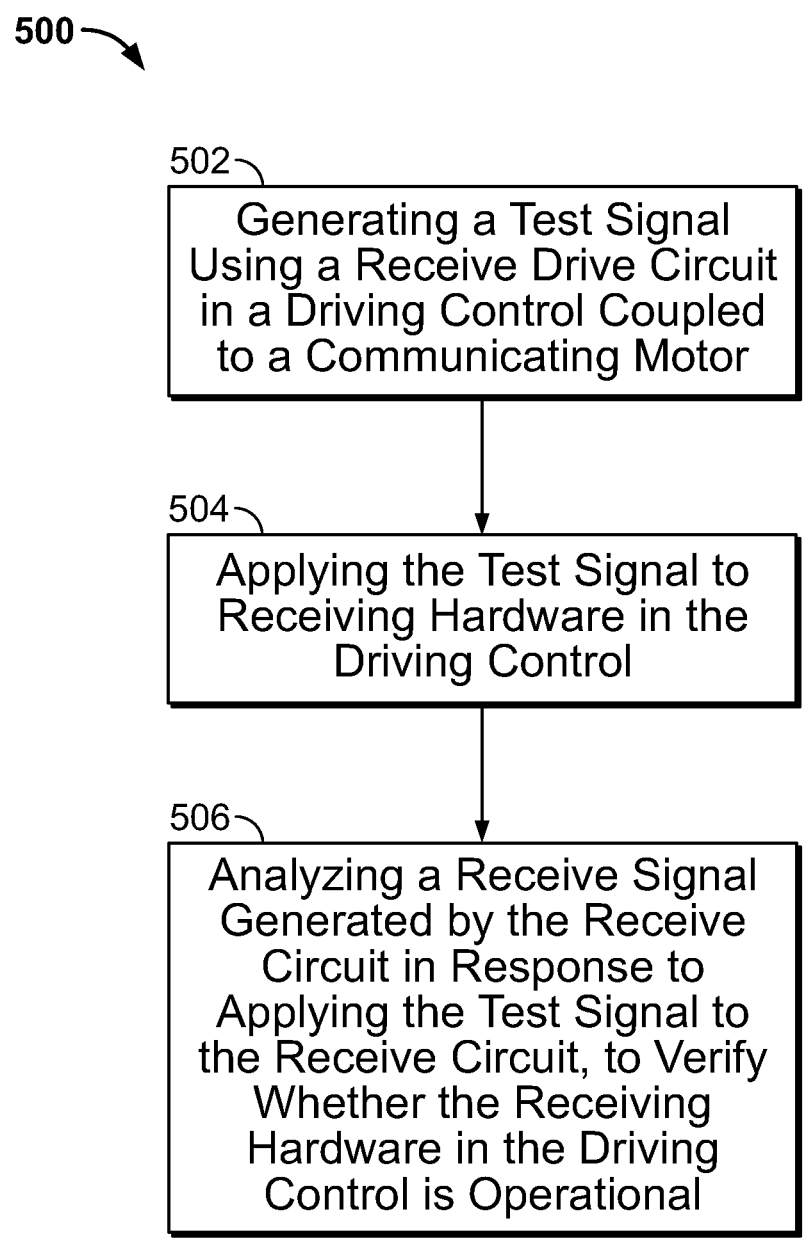
FIG. 5 is a block diagram of a diagnostic method for a communicating motor in accordance with an exemplary implementation of the disclosure.

According to another example embodiment, a diagnostic method for a communicating motor is shown in FIG. 5, referenced generally as method 500. At step, process, or operation 502, the method includes generating a test signal using a receive drive circuit in a driving control coupled to a communicating motor. At step, process, or operation 504, the method includes applying the test signal to receiving hardware in the driving control. At step, process, or operation 506, the method includes analyzing a receive signal generated by the receive circuit in response to applying the test signal to the receive circuit, to verify whether the receiving hardware in the driving control is operational.

Some of these example embodiments provide increased diagnostic information to the user, to aid the user in troubleshooting or further determining problems with the driving control and/or communicating motor. Instead of having to replace the entire driving control and motor, the user may be able to determine only the specific part(s) that need to be replaced to fix the problem, while leaving the other components in the system, saving cost and waste. For example, if the driving control performs a self-test using any of the above methods and determines that the transmitting and receiving hardware is working properly, the user may only need to replace the motor, leaving the driving control in place and saving costs associated with replacing the driving control unnecessarily. If the current sense detects that current is not flowing properly to the motor, the user may only need to replace wiring in the connection between the controller and the motor. If the transmit sense circuit or receive drive circuit are used to determine a problem with the transmit circuit or receive circuit, only those individual components may need to be replaced. Some of these example embodiments allow users to more efficiently fix problems between driving controls and communicating motors that are not working properly.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of operating a driving control for a communicating motor, the method comprising:
    controlling a transmit circuit of the driving control to generate an expected transmit signal for sending to the communicating motor;
    detecting, using a transmit sense circuit in the driving control, the actual resulting signal generated by the transmit circuit signal before the actual resulting signal leaves the driving control and is transmitted to the communicating motor; and
    analyzing the detected signal to verify whether the transmit circuit in the driving control is working properly, by comparing the expected transmit signal to the detected actual resulting signal.

2. The method of claim 1, wherein the expected transmit signal is a test signal representative of a typical transmit signal.

3. The method of claim 1, further comprising:
    receiving, at a receive circuit of the driving control, an expected receive signal;
    detecting the actual resulting receive signal relayed by the receive circuit in response to receiving the expected receive signal; and
    analyzing the detected signal to verify whether the receive circuit in the driving control is working properly, by comparing the expected receive signal to the detected actual resulting receive signal.

4. The method of claim 1, further comprising:
    generating, by a receive drive circuit in the driving control, an expected receive signal;
    applying the expected receive signal to a receive circuit of the driving control;
    detecting the actual resulting receive signal relayed by the receive circuit in response to applying the expected receive signal; and
    analyzing the detected signal to verify whether the receive circuit in the driving control is working properly, by comparing the expected receive signal to the detected actual resulting receive signal.

5. The method of claim 4, wherein the expected receive signal is a test signal representative of a typical receive signal.

6. The method of claim 1, further comprising sensing a current between the transmitting hardware and an output of the driving control to check a connection between the driving control to the communicating motor.

7. The method of claim 1, further comprising sensing a power supply current provided to the communicating motor by a power supply.

8. The method of claim 1, further comprising receiving communicating motor advanced diagnostic information detected by an electronic motor control of the communicating motor.

9. The method of claim 1, further comprising indicating diagnostic information to a user.

10. The method of claim 9, wherein indicating includes indicating using at least one of a display, a user menu, a seven segment display, an LED, and an LCD.

11. The method of claim 1, wherein detecting includes detecting the actual resulting signal at a node between the transmit circuit and an output of the driving control.

12. The method of claim 11, wherein the output of the driving control is coupled to the communicating motor via at least one wire.

13. A method of operating a driving control for a communicating motor, the method comprising:
- receiving, at a receive circuit of the driving control, an expected receive signal;
- detecting the actual resulting receive signal relayed by the receive circuit in response to receiving the expected receive signal; and
- analyzing the detected signal to verify whether the receive circuit in the driving control is working properly, by comparing the expected receive signal to the detected actual resulting receive signal.

14. The method of claim 13, further comprising:
- generating, by a receive drive circuit in the driving control, the expected receive signal; and
- applying the expected receive signal from the receive drive circuit to the receive circuit of the driving control.

15. The method of claim 14, wherein the expected receive signal is a test signal representative of a typical receive signal.

16. The method of claim 13, further comprising:
- sensing a power supply current provided to the communicating motor by a power supply; and/or
- receiving communicating motor advanced diagnostic information detected by an electronic motor control of the communicating motor.

17. The method of claim 13, further comprising indicating diagnostic information to a user.

18. The method of claim 17, wherein indicating includes indicating using at least one of a display, a user menu, a seven segment display, an LED, and an LCD.

19. The method of claim 13, wherein receiving includes receiving the expected receive signal at a node between the receive circuit and an input of the driving control.

20. The method of claim 19, wherein the input of the driving control is coupled to the communicating motor via at least one wire.

* * * * *